(12) United States Patent
Black

(10) Patent No.: US 8,930,422 B2
(45) Date of Patent: Jan. 6, 2015

(54) PIPELINED INCREMENTAL CLUSTERING ALGORITHM

(75) Inventor: Michael D. Black, Quincy, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 256 days.

(21) Appl. No.: 13/487,838

(22) Filed: Jun. 4, 2012

(65) Prior Publication Data

US 2013/0325862 A1 Dec. 5, 2013

(51) Int. Cl.
*G06F 7/00* (2006.01)

(52) U.S. Cl.
USPC .......................................................... 707/820

(58) Field of Classification Search
CPC .................... G06F 17/30601; G06F 17/30705; G06F 19/24; G06F 19/707
USPC ........... 707/748, 749, 750, 754, 820, 999.006
See application file for complete search history.

(56) References Cited

U.S. PATENT DOCUMENTS

| | | | | |
|---|---|---|---|---|
| 6,109,776 | A * | 8/2000 | Haas | 702/20 |
| 7,546,262 | B1 * | 6/2009 | Ferguson et al. | 705/35 |
| 7,805,446 | B2 * | 9/2010 | Potok et al. | 707/737 |
| 7,974,464 | B2 * | 7/2011 | Lee et al. | 382/155 |
| 8,145,677 | B2 * | 3/2012 | Al-Shameri | 707/802 |
| 8,392,153 | B2 * | 3/2013 | Pednault et al. | 703/2 |
| 2002/0079963 | A1 | 6/2002 | Kusunoki | |
| 2004/0014526 | A1 * | 1/2004 | Kulas | 463/43 |
| 2006/0085188 | A1 * | 4/2006 | Goodwin et al. | 704/245 |
| 2008/0101705 | A1 * | 5/2008 | Mohamed et al. | 382/224 |
| 2008/0104007 | A1 * | 5/2008 | Bala | 706/59 |
| 2010/0092075 | A1 * | 4/2010 | Lee et al. | 382/159 |
| 2011/0010307 | A1 * | 1/2011 | Bates et al. | 705/347 |
| 2011/0143650 | A1 * | 6/2011 | Robinson | 455/3.02 |
| 2013/0073490 | A1 * | 3/2013 | Baughman et al. | 706/13 |
| 2013/0080808 | A1 * | 3/2013 | Verma et al. | 713/322 |
| 2013/0097350 | A1 * | 4/2013 | Ansari et al. | 710/244 |
| 2013/0262465 | A1 * | 10/2013 | Galle et al. | 707/737 |

OTHER PUBLICATIONS

Potok: "*Large Scale Data Mining*"; Applied Software Engineering Research Group, Oak Ridge National Laboratory, U.S. Department of Energy, http://cisml.utk.edu/Seminars/2011/Potok-3-7.pdf; pp. 1-29.

* cited by examiner

*Primary Examiner* — Mohammed R Uddin
(74) *Attorney, Agent, or Firm* — Tarolli, Sundheim, Covell & Tummino LLP

(57) ABSTRACT

Systems and methods are provided for large-scale, incrementing clustering. A plurality of processing nodes each include a processor and a non-transitory computer readable medium. The non-transitory computer readable medium stores a plurality of clusters of feature vectors and machine executable instructions for determining a plurality of values for a distance metric relating each of the plurality of clusters to an input feature vector and selecting a cluster having a best value for the distance metric. An arbitrator is configured to receive the selected cluster and best value for the distance metric from each of the plurality of processing nodes and determine a winning cluster as one of the selected clusters and a new cluster. A multiplexer is configured to receive the winning cluster and provide the winning cluster and a new input feature vector to each of the plurality of processing nodes.

17 Claims, 4 Drawing Sheets

PIPELINED INCREMENTAL CLUSTERING ALGORITHM

TECHNICAL FIELD

This invention relates to expert systems, and more particularly, to a pipelined incremental clustering algorithm for discrete data clustering.

BACKGROUND

Data clustering is a technique for statistical data analysis, which can be applied in any of a number of fields, including machine learning, data mining, pattern recognition, image analysis and bioinformatics. Clustering is the classification of similar objects into different groups, or more precisely, the partitioning of a data set into subsets, referred to as clusters, such that the data in each subset share some common trait, often proximity according to some defined distance measure. Data clustering is generally regarded as a form of unsupervised learning.

SUMMARY OF THE INVENTION

In accordance with an aspect of the present invention, a system is provided for large-scale, incrementing clustering. A plurality of processing nodes each include a processor and a non-transitory computer readable medium. The non-transitory computer readable medium stores a plurality of clusters of feature vectors and machine executable instructions for determining a plurality of values for a distance metric relating each of the plurality of clusters to an input feature vector and selecting a cluster having a best value for the distance metric. An arbitrator is configured to receive the selected cluster and best value for the distance metric from each of the plurality of processing nodes and determine a winning cluster as one of the selected clusters and a new cluster. A multiplexer is configured to receive the winning cluster and provide the winning cluster and a new input feature vector to each of the plurality of processing nodes.

In accordance with another aspect of the present invention, a method is provided for large-scale, incremental clustering. An input feature vector is distributed to each of a plurality of processing nodes from a multiplexer. Each processing node includes a processor and a non-transitory computer readable medium. At each of the plurality of processing nodes, a plurality of values for a distance metric are determined. Each value for the distance metric represents the similarity of the input feature vector to a cluster stored at the processing node. A best cluster is selected at each of the plurality of processing nodes according to the plurality of values for the distance metric determined at the processing node. An overall best cluster from the selected best clusters is selected according to their associated values for the distance metric. The overall best cluster is selected as a winning cluster if the value for the distance metric associated with the overall best cluster meets a threshold value. A new cluster is created as the winning cluster if the value for the distance metric associated with the overall best cluster does not meet a threshold value. The identity of the winning cluster is provided to the multiplexer, and the identity of the winning cluster associated with the input feature vector is distributed to the plurality of processing nodes along with a new input feature vector for analysis.

In accordance with yet another aspect of the present invention, a large-scale document clustering system is provided. A content processor is configured to reduce a document to provide an input feature vector. A multiplexer is configured to distribute the input feature vector to a plurality of processing nodes. The plurality of processing nodes each include a processor and a non-transitory computer readable medium. The non-transitory computer readable medium stores a plurality of clusters of feature vectors and machine executable instructions for determining a plurality of values for a distance metric relating each of the plurality of clusters to the input feature vector and selecting a cluster having a best value for the distance metric. An arbitrator is configured to receive the selected cluster and best value for the distance metric from each of the plurality of processing nodes and determine a winning cluster as one of the selected clusters and a new cluster. The multiplexer is configured to receive the winning cluster and provide the winning cluster when a next input feature vector is distributed to the plurality of processing nodes.

DETAILED DESCRIPTION

A system in accordance with an aspect of the present invention processes discrete data and dynamically determines a number of clusters to create based on the content of each incoming vector as part of an incremental clustering process. Incremental clustering processes operate on one data element, referred to herein as an input vector, at a time and either assigns it to an existing cluster, forms a new cluster or disregards as noise. Each incoming vector is distributed to a plurality of processing nodes and compared against all known clusters using a selected distance metric. If the vector is within a threshold radius of a cluster, it is joined to that cluster. The centroid of the cluster is maintained using an appropriate method. If no cluster is found within the threshold radius, a new cluster is created. In the system, an arbitrator is used from multiple machines to determine which machine produced the best answer or, when no machine finds a matching cluster, assign a new cluster to one of the processing nodes.

Figure 1:
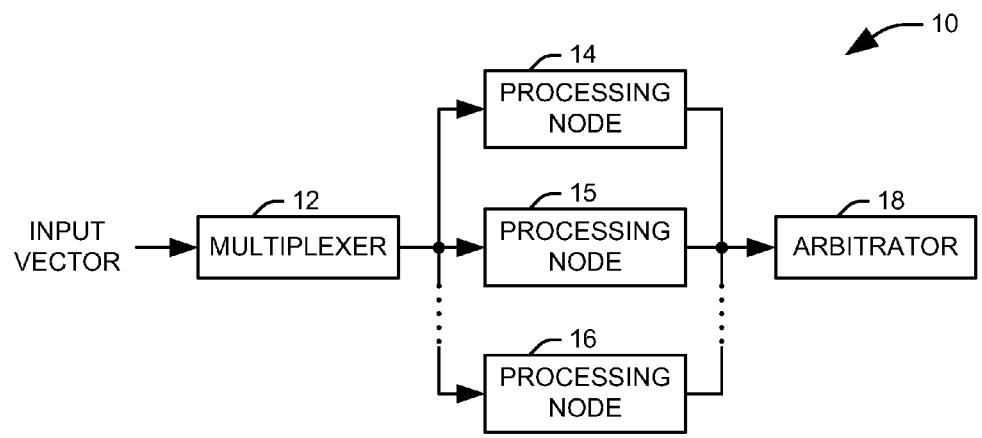
FIG. 1 illustrates a distributed, pipelined incremental clustering system for clustering discrete data in accordance with an aspect of the present invention.

FIG. 1 illustrates a distributed, pipelined incremental clustering system 10 for clustering discrete data in accordance with an aspect of the present invention. The system 10 includes a multiplexer 12 that distributes an input vector to each of a plurality of processing nodes 14-16. It will be appreciated that the input vector can comprise a series of one or both of nominal values (e.g., categorical data) and quantitative values (e.g., ordinal, interval and ratio data). A given processing node can include a non-transitory computer readable medium, storing a plurality of clusters of feature vectors and machine executable instructions for calculating values for distance metric between the input vector and the plurality of clusters, and a processor operatively connected to the non-transitory computer readable medium. Each processing node 14-16 compares the input vector to respective representative vectors of the plurality of clusters maintained at the processing node using an appropriate distance metric and selects a cluster having a best value for the distance metric for the input vector. For example, the distance metric can be a Euclidian or Mahalanobis distance if the data is ratio data or a Jaccard coefficient, cosine measure, or a common elements measure. It will be appreciated that the term "distance metric" is used broadly herein to encompass both metrics that vary directly with the similarity of two vectors as well as metrics that vary inversely with the similarity of the vectors. Further, it will be appreciated that the system 10 can implement multiple distance metrics, with the user selecting an appropriate distance metric when the system is initiated.

Each processing node 14-16 provides its determined best value for the distance metric and the identity of the selected cluster to an arbitrator 18. The arbitrator 18 compares the values for the distance metric from the plurality of processing nodes and determines the processing node associated with an overall best value for the distance metric. If the overall best distance metric value is better than a predetermined threshold value, the identity of the cluster associated with the overall best distance metric value is reported to the multiplexer 12. If the overall best distance metric value is not better than the predetermined threshold value, the arbitrator 18 selects a processing node to which the input vector should be provided as a first vector in a new cluster. For example, the processing node can be selected randomly or according to an associated load balancing scheme. The identity of the selected processing node and an instruction to start a new cluster is then provided to the multiplexer 12.

In accordance with an aspect of the present invention, the operation of the clustering system is pipelined to allow for streamlined operation. Specifically, the selected cluster or node from a previous iteration is provided by the multiplexer 12 to the processing nodes 14-16 with the next input vector, such that the communication in the system can substantially unidirectional without overrunning the queue at each processing node. Accordingly, the system 10 is implemented without reverse communication (e.g., handshaking) from the processing nodes 14-16 to the multiplexer 12 to regulate the speed at which new input vectors are provided to the processor nodes. The illustrated system only requires a handshake process from the arbitrator 18, allowing for a significant increase in the efficiency of the clustering process.

Figure 2:
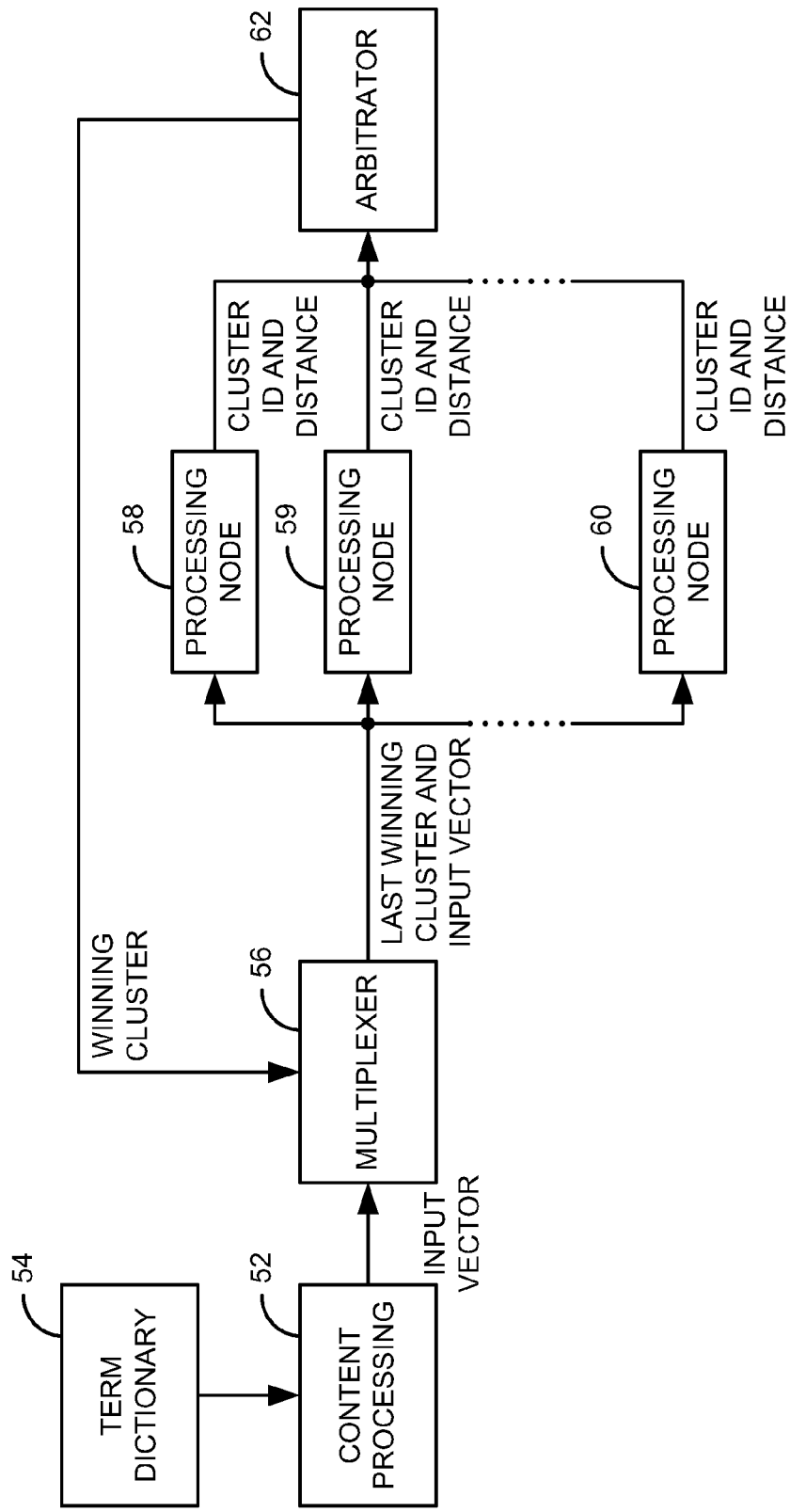
FIG. 2 illustrates one implementation of an incremental clustering algorithm that can be utilized to aggregate streaming data into different categorical groups in accordance with an aspect of the present invention.

FIG. 2 illustrates one implementation 50 of an incremental clustering algorithm that can be utilized to aggregate streaming data into different categorical groups in accordance with an aspect of the present invention. In the illustrated system 50, the clustering algorithm is utilized to perform incremental clustering of feature vectors extracted from text documents, although it will be appreciated that a system in accordance with the present invention can be applied to any of a number of applications.

A content processor 52 processes each document to extract a feature list of terms that can be used for clustering. For example, the document can be scanned for various words, phrases, or other items of interest, referred to collectively herein as "terms" and the presence or frequency of these terms can be recorded to form an input feature vector. In the illustrated implementation, the system includes a dictionary 54 having entries for each of a plurality of terms, and the input vector contains a series of values representing dictionary entries for the terms located in the document. Accordingly, the input vector communicates only the presence or absence of each term in its associated document. It will be appreciated, however, that the content process 52 can be configured differently in different applications, for example, such that each dictionary term is represented as one element in the input vector, with the corresponding element comprising one of a frequency at which the term occurs in the document, a normalized frequency reflecting a ratio of the frequency of occurrence to a total number of terms in the document, and a binary value representing the presence or absence of the term within the document.

The input vector is provided to a multiplexer 56 that distributes the input vector to each of a plurality of processing nodes 58-60. Each processing node 58-60 stores a plurality of clusters, each containing at least one feature vector and representing a group of documents having content that is similar across the dictionary entries. In the illustrated implementation, the system is multi-threaded across all clusters, although it will be appreciated that other implementations are possible within the spirit of the present invention. Each cluster has an associated representative vector, referred to herein as a centroid, used to determine a distance between a given input vector and the represented cluster. For example, the centroid for a given cluster can be designated as the feature vector with the smallest distance sum to all other feature vectors in the cluster or, where a term-frequency feature vector representation is used, a centroid for a cluster can be computed by summing the feature vectors and normalizing by a total number of feature vectors in the cluster. In the illustrated implementation, the first vector placed within each cluster is used as the centroid, updated by shorter length vectors (e.g., vectors representing documents having fewer terms) until a minimum-specified-length vector is achieved.

Each processing node 58-60 calculates a distance metric for each cluster stored at the processing node. The term "distance metric" is used broadly, and can include metrics such as the Euclidean, taxicab, or Mahalanobis distances, measures based on information geometry, and specialized metrics such as a common element measure. It will be appreciated that the specific metric used can be selected by a user when the system is initiated. The data type and format of the input vector and the method for selecting or calculating a centroid can also be selected by the user, subject to any constraints imposed by the selected distance metric (e.g., the selection can be constrained to input vector formats and centroid assignments compatible with the selected distance metrics). For example, where the data is in a term frequency format, specifically, a vector of non-negative integer values that indicate the total number of occurrences of each term in the document, a cosine measure representing a distance between two distributions on a hypersphere manifold, can be used. Each vector is normalized by a total number of represented terms, such that the elements of the vector sum to one, and the square root of each element is taken such that the vector represents a location on a unit hypersphere (e.g., the squared sum of the elements is equal to one). A cosine distance between a first normalized feature vector and a second normalized feature vector is calculated as the inverse cosine of the vector product of a transform of the first vector and the second vector.

Where the data is nominal, a common element measure can be used. Essentially, the common element measure determines a number of elements common to both feature vectors. For each feature vector, a commonality value can be determined as a ratio of the number of elements common to both vectors to the total number of elements in the vector, and with the common element measure determined as the mean of the two commonality vectors. The common element measure is a similarity measurement, but the measure can be converted into a distance value by subtracting it from one.

In the illustrated implementation, a Jaccard coefficient is used to determine the distance values between the input vector and the stored clusters. For a first vector, $\hat{Y}$, representing a first set of terms, Y, and a second vector, $\hat{Z}$, representing a second set of terms, Z, a Jaccard coefficient, $J_{YZ}$, is calculated as the ratio of the number of elements in the intersection of the two sets to the number of elements in the union of the two sets, such that:

$$J_{YZ} = \frac{|Y \cap Z|}{|Y \cup Z|} \qquad \text{Eq. 1}$$

where |X| represents the cardinality of a set, X.

A Jaccard distance can be determined as the ratio of the difference between number of elements that are in the union of the two sets and the number of elements in the intersection of the two sets to the number of elements that are in the union of the two sets. Expressed another way, allowing p to represent the intersection of the two sets, q to represent those elements that are members of Y but not members of Z, and r to represent those elements that are members of Z but not members of Y, the Jaccard coefficient can be alternatively expressed as:

$$J_{YZ} = \frac{p}{p+q+r} \qquad \text{Eq. 2}$$

And the Jaccard distance, $JD_{YZ}$, can be expressed as:

$$JD_{YZ} = \frac{q+r}{p+q+r} \qquad \text{Eq. 3}$$

A Sørensen similarity index is determined as the ratio of the twice the number of elements in the intersection of the two sets to the sum of the number of elements in first set and the number of elements in the second set. Accordingly, for a first vector, $\hat{Y}$, representing a first set of terms, Y, and a second vector, $\hat{Z}$, representing a second set of terms, Z, a Sørensen similarity index, QS, can be determined as:

$$QS = \frac{2|Y \cap Z|}{|Y| + |Z|} \qquad \text{Eq. 4}$$

where |X| represents the cardinality of a set, X.

Accordingly, in the illustrated implementation, each processing node 58-60 determines a Jaccard coefficient representing the similarity of the input vector to the centroids of each of its represented cluster. The cluster with the highest Jaccard coefficient is selected as the winning cluster. It will be appreciated that where a different metric were used, such as the Jaccard distance, the lowest value would indicate the highest degree of similarity and would be selected accordingly. The identity of the winning cluster for each processing node 58-60, as well as the Jaccard coefficient for that cluster, is provided to the arbitrator 62.

The arbitrator 62 compares the Jaccard coefficient from each processing node 58-60 to determine an overall winning cluster and an associated Jaccard coefficient from among the processing nodes. In accordance with an aspect of the present invention, the system utilized a fixed radius clustering, where only input vectors falling within a certain range of a centroid are accepted. It has been determined that Jaccard coefficient lends itself well to a fixed radius as it returns a value of zero to one, where a zero represents two vectors with nothing in common and a one represents a perfect match. Fixed-radius clustering allows the user to specify a radius threshold that is used to determine if a document belongs to a cluster or if it should designated as the start of a new cluster. It will be appreciated that it is possible to utilize the fixed-radius approach with other distance measures in accordance with the present invention.

In accordance with the fixed radius approach, the arbitrator 62 determines if the Jaccard coefficient is greater than a predetermined threshold value. If so, the winning cluster is accepted and the identity of the winning cluster is provided to the multiplexer 56. If not, the arbitrator 62 determines that a new cluster is necessary for the input vector. The arbitrator 62 assigns the new cluster to one of the processing nodes 58-60 according to an assignment algorithm at the arbitrator. The assignment algorithm can be, for example, a pseudorandom determination of which processing node 58-60 receives the new cluster or a load balancing algorithm that facilitates the used of processing nodes with unequal processing resources. In one implementation, the load balancing uses a round-trip time calculation, that is, the time from a last finish of the clustering to a receipt of the next vector, to take into account all aspects of a given processing node's resources. Once assigned to a processing node 58-60, the new cluster is reported to the multiplexer 56 as the winning node. The multiplexer 56 reports the previous winning cluster along with the new input cluster, with the processing node (e.g., 58) associated with the winning cluster, new or existing, assigning the previous input vector to the winning cluster and all other processing nodes 59-60 deleting the previous input cluster. The processing nodes 58-60 then process the new input vector as described above.

In accordance with an aspect of the present invention, a pipelined approached is used, such that all communication with the processing nodes 58-60 is unidirectional. In other words, the multiplexer 56 sends the input vector to the processing nodes 58-60, but there is no direct return communication. Similarly, the processing nodes 58-60 provide clustering results to the arbitrator 62, but the arbitrator 62 does not directly communicate the results to processing nodes 58-60. The pipelined approach allows for incrementally clustering feature vectors into an arbitrary number of clusters. To this end, it can support unsupervised (where clusters are automatically discovered based on incoming feature vectors) and semi-supervised (where user feedback is accepted about cluster associations) operating modes. Further, the system can be made such that different feature vector similarity measures can be substituted for different levels of analysis.

Figure 3:
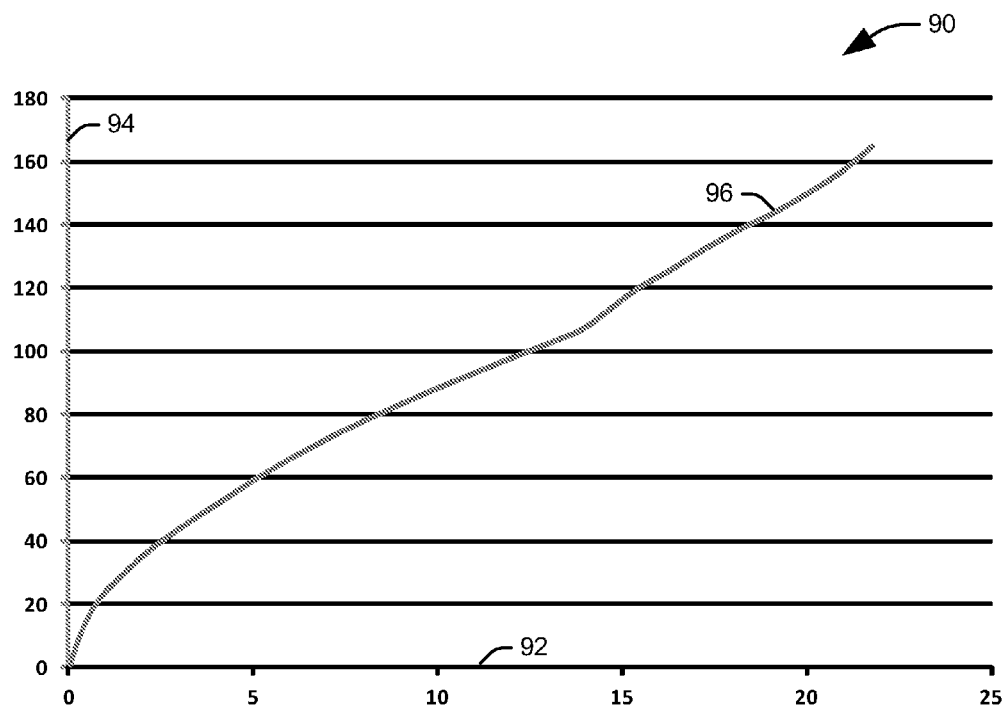
FIG. 3 is a chart illustrating the speed at which a system implemented in accordance with an aspect of the present invention can cluster documents in a large scale clustering application.

FIG. 3 is a chart 90 illustrating the speed at which a system implemented in accordance with an aspect of the present invention can cluster documents in a large scale clustering application. A horizontal axis 92 represents time, in days, and a vertical axis 94 represents documents, in millions. "Large data" is an arbitrary phrase in the world of document clustering, but it is used herein to refer to efforts to cluster tens or hundreds of millions of source documents. Existing clustering methodologies, particular incremental methodologies, have no capacity for of dealing with this much data in any practical timeframe.

The clustering system described in FIG. 2 is a minimum-capability clustering method designed for speed. Some capability in clustering is lost using the techniques described herein, but the system as implemented is capable of clustering fifty thousand documents in approximately ten seconds, assuming the features are already extracted. This is unmatched in current systems. In addition, the system includes a scaling mechanism which allows clustering across multiple machines allowing one to scale things up to dozens or hundreds of machines. In general, clustering slows down as time goes on (i.e., more clusters means more processing needed to match them), but it will be noted that the process of the system, indicated in FIG. 3 as a solid line 96, has not leveled off significantly even after one hundred sixty million documents have been clustered. It is thus submitted that the illustrated clustering system provides a true large clustering system.

Figure 4:
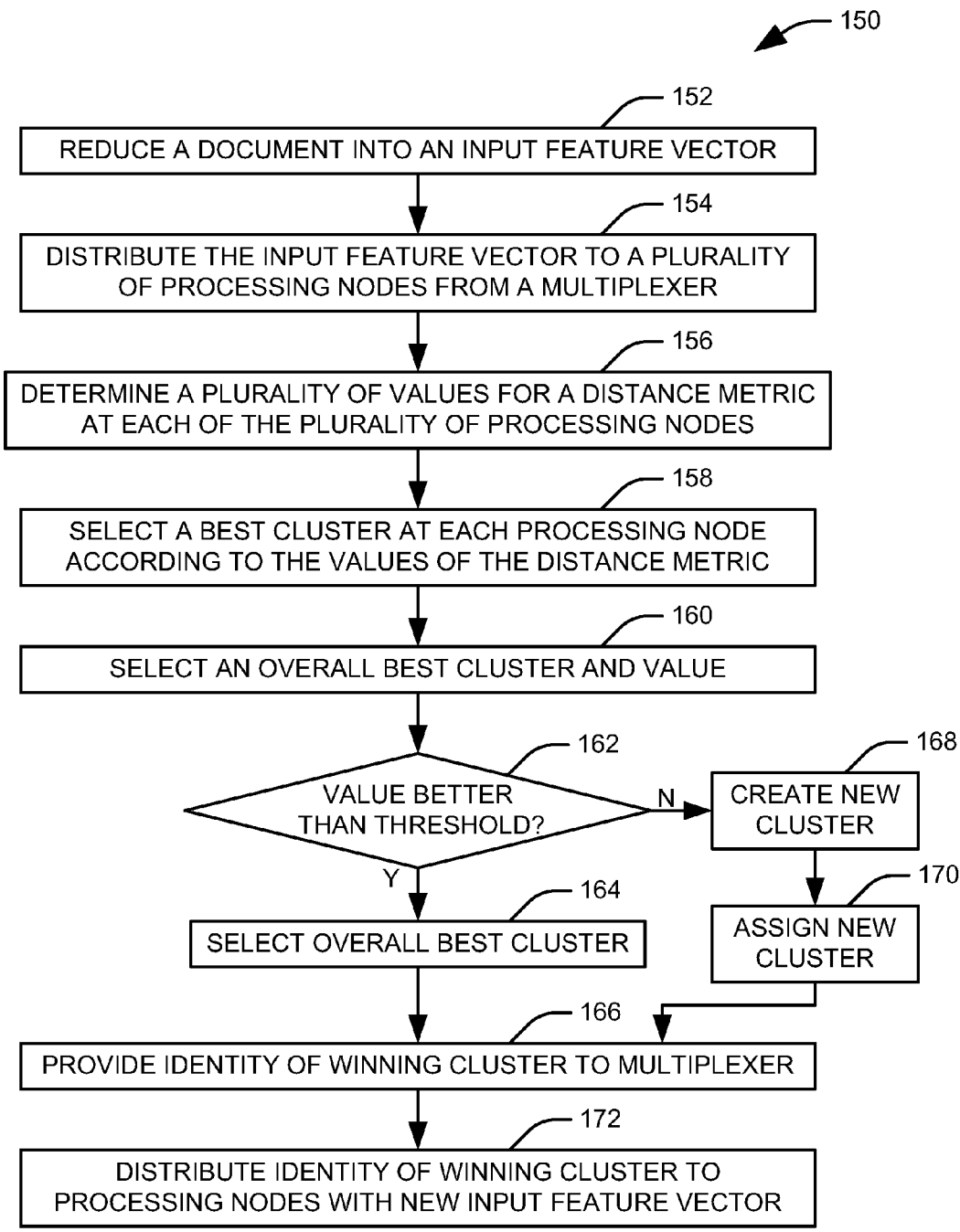
FIG. 4 illustrates a method for incremental clustering of large numbers of documents in accordance with an aspect of the present invention.

In view of the foregoing structural and functional features described above in FIGS. 1 and 2, example methodologies will be better appreciated with reference to FIG. 4. While, for purposes of simplicity of explanation, the methodology of FIG. 4 is shown and described as executing serially, it is to be understood and appreciated that the present invention is not limited by the illustrated order, as some actions could in other examples occur in different orders and/or concurrently from that shown and described herein.

FIG. 4 illustrates a method 150 for incremental clustering of large numbers of documents in accordance with an aspect of the present invention. At 152, a document is reduced into an input feature vector for clustering. For example, there can be a dictionary of terms that are used for the clustering, and the input feature vector can indicate the frequency associated with each term, or even just the presence or absence of each term. For example, a vector of determined frequencies for the dictionary of terms can be normalized according to a total number of terms within the document to produce the input feature vector. At 154, the input feature vector is distributed to each of a plurality of processing nodes from a multiplexer. Each processing node can include a processor and a non-transitory computer readable medium.

At 156, a plurality of values for a distance metric are determined at each of the plurality of processing nodes. Each value represents the similarity of the input feature vector to a cluster stored at the processing node. The specific distance metric will depend on the nature of the data and the specific application, but illustrative distance metrics can include a common words measure, a Jaccard distance, a cosine distance on a unit hypersphere, and a Jaccard coefficient. At 158, a best cluster is selected at each of the plurality of processing nodes according to the plurality of distance metric values determined at the processing node. It will be appreciated that the "best cluster" will be the cluster having the smallest value for distance metric when the distance metric represents a distance, and the largest value for the distance metric when the distance metric is a similarity measure.

At 160, an overall best cluster is selected from the selected best clusters from the plurality of processing nodes according to their associated values for the distance metric. Again, what constitutes the best cluster will vary with the specific distance metric selected. At 162, it is determined if the overall best cluster has an associated distance metric value that meets a threshold value. Essentially, the threshold value defines a radius around a representative vector associated with the overall best cluster, and the input feature vector is assigned to the cluster only if it falls within the defined radius. If the distance metric value associated with the overall best cluster meets the threshold value (Y), the overall best cluster is selected at 164 and the method advances to 166. If the distance metric value associated with the overall best cluster does not meet the threshold value (N), a new cluster is created as the winning cluster at 168. The new cluster is assigned to one of the processing nodes at 170, and the method advances to 166. For example, the cluster can be assigned randomly to one of the processing nodes or assigned according to the current processing load at each processing node according to an associated load balancing algorithm.

At 166, the identity of the winning cluster is provided to the multiplexer. At 172, the identity of the winning cluster is provided to the plurality of processing nodes along with a new input feature vector for analysis. When the identity of the winning cluster is received, the processing node associated with the winning cluster assigns the old input feature vector to the appropriate cluster, either existing or newly created. Every other processing node deletes the old input feature vector. The new input feature vector is then processed in a similar manner.

Figure 5:
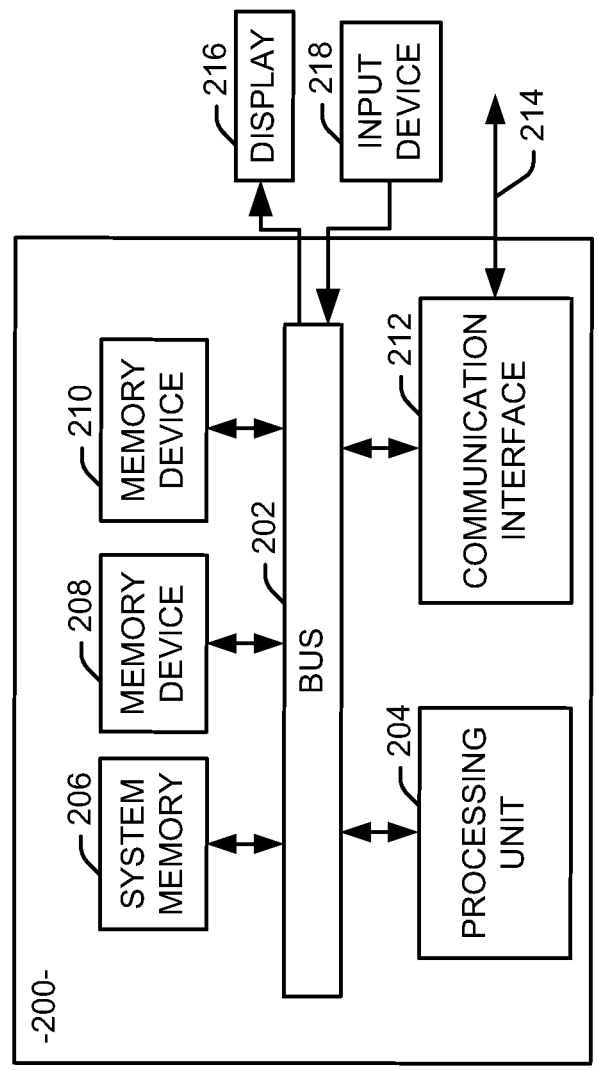
FIG. 5 is a schematic block diagram illustrating an exemplary system of hardware components.

FIG. 5 is a schematic block diagram illustrating an exemplary system 200 of hardware components capable of implementing examples of the systems and methods disclosed in FIGS. 1-4, such as the large scale clustering system illustrated in FIGS. 1 and 2. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can includes a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a large scale clustering system in accordance with the present invention. Computer executable logic for implementing the composite applications testing system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A system for large-scale, incremental clustering comprising:
   a plurality of processing nodes, each comprising a processor and a non-transitory computer readable medium storing a plurality of clusters of feature vectors and machine executable instructions for determining a plurality of values for a distance metric relating each of the plurality of clusters to an input feature vector and selecting a cluster having a best value for the distance metric;
   an arbitrator configured to:
      receive the selected cluster and best value for the distance metric from each of the plurality of processing nodes and determine a winning cluster as one of the selected clusters and a new cluster;
      accept the selected cluster if its associated best value for the distance metric meets a threshold value and to create the new cluster if the best value for the distance metric does not meet a threshold value; and
   a multiplexer configured to receive the winning cluster from the arbitrator and provide the winning cluster and a new input feature vector to each of the plurality of processing nodes, wherein the winning cluster is associated with a given processing node of the plurality of processing nodes, the given processing node being configured to associate the input feature vector with the winning cluster and each other processing node of the plurality of processing nodes is instructed to delete the input feature vector.

2. The system of claim 1, a content processor configured to reduce a document to provide the input feature vector and provide the input feature vector to the multiplexer.

3. The system of claim 1, the distance metric is selectable by a user from a plurality of available distance metrics.

4. The system of claim 3, wherein the input feature vector contains nominal data and the plurality of available distance metrics include a Jaccard distance, a common element measure, a Sørensen similarity index, and a Jaccard coefficient.

5. The system of claim 1, wherein the input feature vector contains ordinal data and the distance metric is a cosine distance on a unit hypersphere.

6. The system of claim 1, wherein the threshold value is selectable by a user.

7. The system of claim 1, wherein, when the winning cluster is determined to be the new cluster, the arbitrator is configured to randomly assign the new cluster to one of the plurality of processing nodes.

8. The system of claim 1, wherein, when the winning cluster is determined to be the new cluster, the arbitrator is configured to assign the new cluster to one of the plurality of processing nodes according to a load balancing algorithm.

9. The system of claim 1, wherein the plurality of clusters stored at each processing node each have an associated representative vector, the processing nodes determining the plurality of values for the distance metric as to relate the input feature vector to each of the representative vectors.

10. The system of claim 9, wherein the representative vector for each of the plurality of clusters is a feature vector within the cluster with the smallest distance sum to all other feature vectors in the cluster.

11. The system of claim 9, wherein the representative vector for each of the plurality of clusters is determined according to one of a plurality of centroid assignment methods, and the user selects the one of the plurality of centroid assignment methods.

12. The system of claim 9, wherein the representative vector for each of the plurality of clusters is a first vector placed within each cluster updated by shorter length vectors until a minimum-specified-length vector is achieved.

13. A method for large-scale, incremental clustering comprising:
   distributing an input feature vector to each of a plurality of processing nodes from a multiplexer, each processing node comprising a processor and a non-transitory computer readable medium;
   determining, at each of the plurality of processing nodes, a plurality of values for a distance metric, with each value representing the similarity of the input feature vector to a cluster stored at the processing node;
   selecting a best cluster at each of the plurality of processing nodes according to the plurality of values for the distance metric determined at the processing node;
   selecting an overall best cluster from the selected best clusters according to their associated values of the distance metric;
   selecting the overall best cluster as a winning cluster if the distance metric associated with the overall best cluster meets a threshold value;
   creating a new cluster as the winning cluster if the distance metric associated with the overall best cluster does not meet a threshold value;
   providing the identity of the winning cluster from an arbitrator to the multiplexer; and
   distributing the identity of the winning cluster associated with the input feature vector to the plurality of processing nodes along with a new input feature vector for analysis, wherein the winning cluster is associated with a given processing node of the plurality of processing nodes, the given processing node being configured to associate the input feature vector with the winning cluster and each other processing node of the plurality of processing nodes is instructed to delete the input feature vector.

14. The method of claim 13, further comprising allowing the user to select the distance metric from a plurality of available distance metrics.

15. The method of claim 13, further comprising allowing the user to select the threshold value.

16. A large-scale document clustering system comprising:
   a content processor configured to reduce a document to provide an input feature vector;
   a multiplexer configured to distribute the input feature vector to a plurality of processing nodes;
   the plurality of processing nodes, each comprising a processor and a non-transitory computer readable medium storing a plurality of clusters of feature vectors and machine executable instructions for determining a plurality of values for a distance metric relating each of the plurality of clusters to the input feature vector and selecting a cluster having a best value for the distance metric; and an arbitrator configured to:
- receive the selected cluster and best value for the distance metric from each of the plurality of processing nodes and determine a winning cluster as one of the selected clusters and a new cluster; and
- accept the selected cluster if its associated best value for the distance metric meets a threshold value and to create the new cluster if the best value for the distance metric does not meet a threshold value, wherein the multiplexer is configured to receive the winning cluster from the arbitrator and provide the winning cluster when a next input feature vector is distributed to the plurality of processing nodes, the winning cluster being associated with a given processing node of the plurality of processing nodes, the given processing node being configured to associate the input feature vector with the winning cluster and each other processing node of the plurality of processing nodes is instructed to delete the input feature vector.

17. The system of claim 16, the system further comprising a dictionary having entries for each of a plurality of terms, the content processor generating the input feature vector as a series of values representing dictionary entries for terms located in the document, such that the input feature vector communicates the presence or absence of each term in the document.

* * * * *